US012743684B2

(12) United States Patent
Housser et al.

(10) Patent No.: US 12,743,684 B2
(45) **Date of Patent: *Sep. 22, 2026**

(54) DISTRIBUTED CRYPTOGRAPHIC TOKENS WITH DOWNSTREAM ADMINISTRATIVE CONTROL

(71) Applicant: Polymath Inc., St. Michael (BB)

(72) Inventors: Chris Housser, Toronto (CA); Trevor Koverko, Toronto (CA); Pablo Ruiz, Buenos Aires (AR); Adam Dossa, Holetown (BB)

(73) Assignee: Polymath Inc., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,977

(22) Filed: Aug. 29, 2024

(65) Prior Publication Data

US 2025/0094945 A1 Mar. 20, 2025

Related U.S. Application Data

(63) Continuation of application No. 17/663,705, filed on May 17, 2022, now Pat. No. 12,086,771, which is a (Continued)

(51) Int. Cl.

*G06Q 20/06* (2012.01)
*G06Q 20/38* (2012.01)
*G06Q 30/018* (2023.01)

(52) U.S. Cl.

CPC ..... *G06Q 20/0658* (2013.01); *G06Q 20/3825* (2013.01); *G06Q 20/389* (2013.01); *G06Q 30/018* (2013.01); *G06Q 2220/00* (2013.01)

(58) Field of Classification Search

CPC ........... G06Q 20/0658; G06Q 20/3825; G06Q 20/389; G06Q 30/018; G06Q 2220/00; (Continued)

(56) References Cited

U.S. PATENT DOCUMENTS

| | | | | |
|---|---|---|---|---|
| 11,012,242 | B1 * | 5/2021 | Griffin | H04L 9/50 |
| 2017/0011460 | A1 * | 1/2017 | Molinari | H04L 9/3247 |

(Continued)

FOREIGN PATENT DOCUMENTS

| | | | | |
|---|---|---|---|---|
| CN | 108764852 | A * | 11/2018 | G06Q 10/101 |
| KR | 20180074655 | A | 7/2018 | |
| WO | 2017011601 | A1 | 1/2017 | |

OTHER PUBLICATIONS

U.S. Appl. No. 62/738,848, filed Sep. 28, 2018 (Year: 2018).*

(Continued)

*Primary Examiner* — Duan Zhang
(74) *Attorney, Agent, or Firm* — Ashurst Perkins Coie US LLP; Colin Fowler

(57) ABSTRACT

Disclosed is a platform That enables centralized control over updates to a distributed cryptocurrency network through inclusion of an administrative user to a set of tokens that operate on a base cryptocurrency network but include rule sets that are separate from those of the base cryptocurrency. A plurality of customized token types are generated by a platform provider for respective administrative users. The platform provider may provide software updates that are implemented at the sole discretion of the respective administrative users.

19 Claims, 7 Drawing Sheets

Related U.S. Application Data continuation of application No. 16/287,906, filed on Feb. 27, 2019, now Pat. No. 11,361,289.

(60) Provisional application No. 62/636,036, filed on Feb. 27, 2018.

(58) Field of Classification Search
CPC ...... G06Q 20/405; G06Q 20/02; G06Q 20/10; G06Q 20/0655
See application file for complete search history.

(56) References Cited

U.S. PATENT DOCUMENTS

| | | | | |
|---|---|---|---|---|
| 2019/0205844 | A1* | 7/2019 | Nuzzi | G06Q 20/0655 |
| 2019/0259025 | A1 | 8/2019 | Hilton et al. | |
| 2019/0303887 | A1* | 10/2019 | Wright | G06F 16/27 |
| 2019/0306137 | A1* | 10/2019 | Isaacson | H04W 12/084 |
| 2020/0097968 | A1* | 3/2020 | Sukhija | G06Q 20/108 |
| 2020/0104958 | A1* | 4/2020 | Cheng-Shorland | G06Q 10/107 |
| 2020/0235947 | A1 | 7/2020 | Baykaner et al. | |
| 2021/0097795 | A1 | 4/2021 | Manchovski | |

OTHER PUBLICATIONS

"CryptoKitties: The World's First Ethereum Game Launches Today", Nov. 28, 2017, PR Newswire (Year: 2017).
Cryptokitties (Kryptokitties_Technical Details), 2017-present, 10 pages, 10 pages.
Cryptokitties (FAQ) 2017-present, 2017, 7 pages, 7 pages.
Cryptokitties (Gas_Fees), 2017-Present, 2017, 3 pages, 2017, 3 pages.

* cited by examiner

DISTRIBUTED CRYPTOGRAPHIC TOKENS WITH DOWNSTREAM ADMINISTRATIVE CONTROL

CROSS-REFERENCE TO RELATED APPLICATIONS

This application is a continuation of Ser. No. 17/663,705 filed on May 17, 2022, now U.S. Pat. No. 12,086,771, which is a continuation of U.S. patent application Ser. No. 16/287,906 filed on Feb. 27, 2019, now U.S. Pat. No. 11,361,289, which claims priority to U.S. Provisional Patent Application No. 62/636,036 filed on Feb. 27, 2018, the contents of which are incorporated herein by reference in their entireties.

TECHNICAL FIELD

The disclosure relates to distributed consensus networks and more particularly to data structures that enable controls over cryptographic tokens.

BACKGROUND

Cryptocurrencies such as Bitcoin and Ethereum operate on distributed consensus networks that are recorded by blockchain data structures. A blockchain is an immutable, append-only public ledger. A benefit of such a data structure is that is reliable, secure, and open. However, one of the benefits, specifically the requirement that 51% of the processing power of the network must agree in order to make changes can also serve to make adequate control unfeasible.

DETAILED DESCRIPTION

The emergence of Cryptocurrency as a deregulated currency has posed problems for regulatory bodies such as the United States Government. In some circumstances, it behooves users to cooperate with regulatory bodies. In those circumstances, the distributed nature of the cryptographic coins impedes the ability to comply. Thus, there is a need to implement a cryptographic coin that retains many of the benefits of the distributed system but includes data structures that enable compliance with regulatory agencies and serve as a security.

Structurally, in some embodiments, customized, flexible cryptographic tokens connected to a smart contract are powered by a less flexible, base cryptocurrency. Miners operating on the network for the base cryptocurrency power execution of a distributed application (dApp) or smart contract. The smart contract is held by an administrative user and includes all of the custom cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

Where the smart contract remains in the control of the administrative user, the administrative user is able to implement changes to the custom cryptographic token unilaterally. Changes include implementing secondary transfer restrictions, as well as implementing software updates and new functionality on an otherwise distributed system. The cryptographic relationship of different entities interacting with the smart contract data structure enables useful functionality not previously available in cryptocurrency systems.

As a platform, a provider may generate smart contracts to distribute to a plurality of administrative users. Each smart contract corresponds to a unique custom cryptographic token. Once created and given to an administrative user, the platform provider loses control of the customizability of the token. Software updates and feature adds are taken at the discretion of the administrative user.

The platform provider uses a blockchain-based protocol that provides a suite of tools to coordinate and incentivize participants to collaborate and launch financial products on the blockchain. By creating a standard token protocol which embeds defined requirements into the tokens themselves, these tokens can only be purchased and traded among verified participants.

Figure 1:
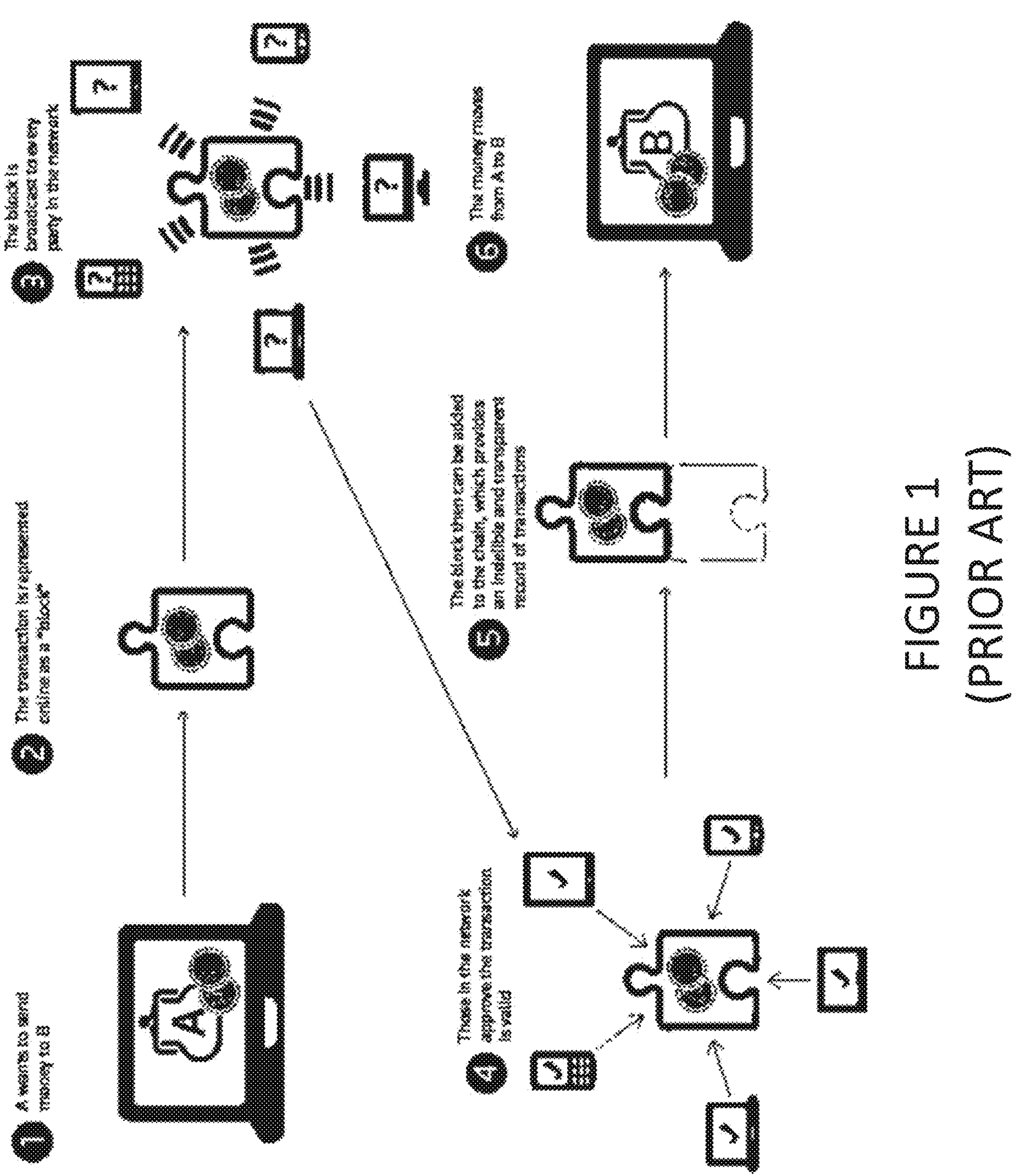
FIG. 1 is a flow chart diagram of lockchain data processing.

FIG. 1 is a block diagram of a blockchain data structure. Cryptocurrency networks operate on a distributed network architecture. Key to understanding cryptocurrency is the data structure upon which the network operates. For example, the Bitcoin and Ethereum networks use a data structure referred to as a blockchain.

The blockchain includes a history of all transactions that have ever occurred on the network. Each full node in the distributed network holds a full copy of the blockchain. To participate in the network at all, the blockchain history must be consistent with the history of at least a majority of other nodes. This consistency rule has an important effect of causing the blockchain to be immutable. In order to effectively attack a blockchain, one must control 51%+ of the processing power of the entire network. Where the network is comprised of thousands of nodes, assembling the requisite 51% is exceedingly difficult. While it is true that many nodes often group together in pools that together work together to solve for nounces to propagate the blockchain, the grouped nodes of the pool do not necessarily share common control. While they have agreed to pay any mined coins to a central pot that is shared amongst the pool, this is far and away from agreeing to make changes to the blockchain.

When a given node intends to generate a transaction, the transaction is propagated throughout the nodes until it reaches a node or group of nodes that can assemble that transaction and other transactions generated during a contemporaneous period of time into a block. Until a transaction appears in a block it is not published or public. Often a transaction isn't considered confirmed until 6 additional blocks have been added.

At the time of this filing, Bitcoin blocks are limited to the size of 1 MB and are generated approximately every 10 to 15 minutes. This illustrates an important limitation of the Bitcoin network, that it only processes approximately 7 transactions per second. Conversely, Ethereum limits block size based on the amount of processing the contracts in the given block call for and are appended every 5 to 15 seconds. While cryptocurrency networks technically begin processing transactions in real-time, and the existence of a block including a given transaction verifies that transaction's authenticity, until that block is published to the blockchain, the transaction is not verified.

Gaps in verification time introduces the issue within the Bitcoin network at a given moment of "who has the money." During the 10 to 15-minute span between block generation transactions that have been submitted may not actually process. This would occur when a user spends money they didn't have, or double spends. This is not to say the network has no verification mechanism between blocks. For example, when a given user attempts to pay another user, the system may easily query older blocks to inspect the given user's balance as of at least the most recently published block. If the given user has sufficient funds, it is moderately safe to trust the transaction.

However, if the given user is attempting to double spend all their money, only one of those transactions will publish in the next block. The other will be rejected (which is rejected, and which processes is subject of a race condition and not necessarily dependent on time of generation). When discussing trivial amounts of money (e.g., paying for coffee), this is not really a big concern. However, when handling larger purchases that occur quickly (e.g. stock in a company), the amounts can become significantly greater, and a clearance time of 10-15 minutes is not ideal.

Thus far, Bitcoin has been discussed as a network for trading Bitcoins. However, Bitcoin transactions have additional utility in that they can embed additional data. As contemplated above, Bitcoin can be used to purchase and record the existence of data at a given point in time. Recording data is performed by including hashed data within an output field of a given transaction. In this manner, the proof of existence for any document or recorded data may be embedded into the immutable history of the blockchain.

Systems that utilize the Bitcoin blockchain to transfer the ownership of non-coin assets require software that is separate from and merely relies upon the immutability of the blockchain. The separate software is not necessarily secure or immutable itself. Extra-blockchain software is thus an inherent weak point in a system that relies upon the immutability of the blockchain to ensure security. Ethereum takes the ability to buy and sell non-coin assets a step further.

Ethereum smart contracts are in effect software that runs on the blockchain. That software is open source and subject to inputs that are related to the blockchain itself. Of course, one can still write code including vulnerabilities, but the platform enables greater security and fewer weak links in the chain.

Figure 2:
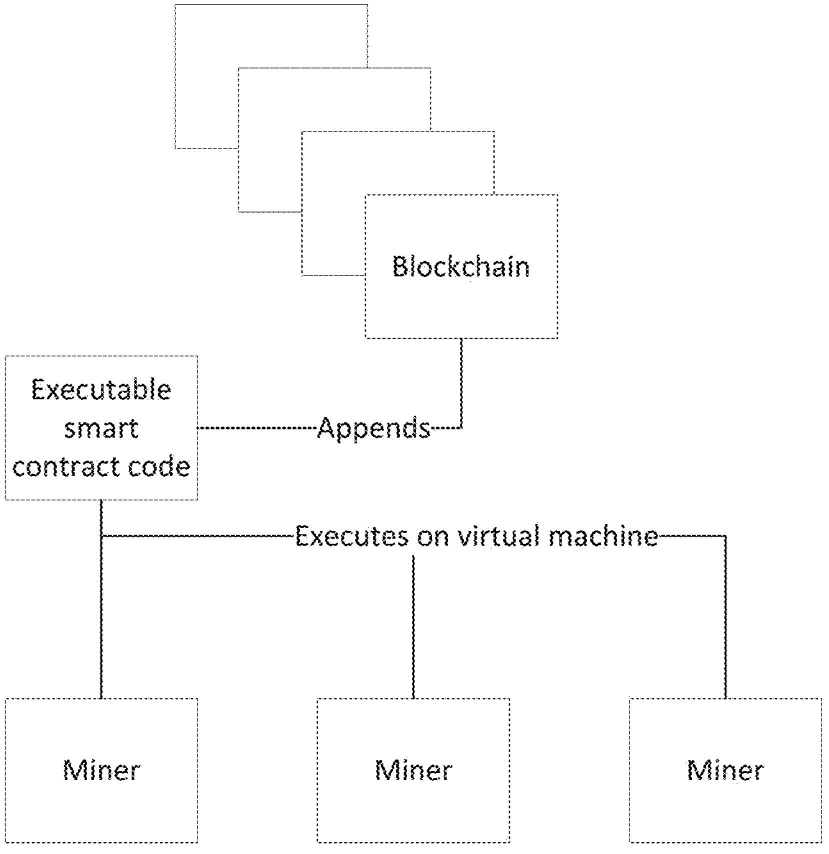
FIG. 2 is a block diagram illustrating a data structure of a smart contract.

FIG. 2 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. for example, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from the Bitcoin transaction fee, which is only dependent on the size in kilobytes of a transaction. As a result that Ethereum's gas costs are rooted in computations, even a short segment of code can result in a significant amount of processing performed. The use of gas further enforces s incentivizes coders to generate efficient smart contracts/algorithms. Otherwise the cost of execution may spiral out of control. Unrestricted, an exponential function may bankrupt a given user.

While operations in the Ethereum virtual machine (EVM) have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-20 tokens (Ethereum Request for Comment-20). ERC-20 is a technical specification for fungible utility tokens. ERC-20 defines a common list of rules for Ethereum tokens to follow within the larger Ethereum ecosystem, allowing developers to accurately predict interaction between tokens. These rules include how the tokens are transferred between addresses and how data within each token is accessed. ERC-20 provides a framework for a means to build a token on top of a base cryptocurrency. In some embodiments herein, enhancements are built on top of the ERC-20 framework, though use of the ERC-20 technical specification is not inherently necessary and is applicable to circumstances where Ethereum is used as the base cryptocurrency.

Thus far discussion has been focused around Bitcoin and Ethereum. As applicable in this disclosure, these are base cryptocurrencies. Other base cryptocurrencies exist now and in the future. This disclosure is not limited to application on specifically the Bitcoin or Ethereum blockchains.

A custom cryptographic token as described in this disclosure (hereafter, “custom token”) described herein shares many of the characteristics of both fungible (ERC-20) and non-fungible tokens (ERC-721). Custom tokens may be designed to represent complete or fractional ownership interests in assets and/or entities. While utility tokens have no limitations on who can send or receive the token, custom tokens are subject to many restrictions based on identity, jurisdiction and asset category.

The concept of utility tokens is understood in the blockchain space today. Utility tokens represent access to a network, and a give utility token purchase represents the ability to buy goods or services from that network—for example, an arcade token allows users to play an arcade game machine. Utility tokens give users that same type of access to a product or service. On the other hand, custom tokens represent complete or fractional ownership in an asset (such as shares in a company, a real-estate asset, artwork, etc). Owning a stake in a company, real estate, or intellectual property can all be represented by custom tokens. Custom tokens offer the benefit of bringing significant transparency over traditional paper shares through the use of the blockchain and its associated public ledger. Custom token structure, distribution, or changes that could affect investors are now accessible to all via the blockchain.

Securities Regulation

For centuries, the regulation of securities has encountered cycles of increased regulation and deregulation. New regulations were enacted in response to a major economic disaster, and deregulation resulted from movements to ease the requirements of regulatory compliance in an effort to stimulate economic growth. A number of those regulations are discussed below:

The Bubble Act (United Kingdom) required companies to get a royal charter before selling shares. To this day, in the U.S., companies are formed by making a state filing that grants their existence. The U.S. The Securities Act of 1933 had two main objectives: 1. Require investors to receive financial and other material information concerning securities being offered for public sale. 2. Prohibit deceit, misrepresentations, and other fraud in the sale of securities. The Securities Exchange Act of 1934 was introduced a year later to regulate the secondary sale of securities-sales taking place after a security has been initially offered by a company.

The Exchange Act also established the United States Securities and Exchange Commission (SEC) in order to enforce its provisions. Sarbanes-Oxley Act of 2002 required companies to be responsible for satisfying reporting requirements and disclosure obligations set by the SEC or else risk enforcement action. The Dodd-Frank Wall Street Reform and Consumer Protection Act came into law in 2010 caused compliance complexity to dramatically increase. As the regulations change, in order for a custom token to adapt, implementation of updated restrictions cannot necessarily wait for 51% of owners to agree to the regulations. Data structures of the custom token thus enable an administrative user to unilaterally apply changes to function and secondary exchange of the custom token.

Initial Coin Offerings

In some embodiments, the custom token system as provided by the platform provider provides an effective data structure for conducting initial coin offerings (ICO) and subsequently managing a coin market. Some embodiments of custom tokens represent an equity stake in an organization, or a claim to the wealth generated by its activities. Sales or issuances of these tokens with these features tend to constitute a securities offering, which means that they are subject to securities regulations; issuers need to ensure that token sales comply with all applicable securities laws or risk severe penalties.

Traditional crypto coin apparatus at their core are focused on the efficient transferability of tokens. The focus on efficient transferability may be stifled by a regulatory apparatus that requires intermediaries and government filings of various kinds. In contrast to traditional Securities offerings, the general public still does not have a good grasp on the truly wide range of products and technology underlying the many tokens that technologists have created, and because securities regulators are still only beginning to think about developing rules for this space, regulatory bodies have temporarily resorted to issuing warnings. ICO investors are cautioned about the investment and enforcement risks of ICOs, and issuers—even pure coders who think they are just pushing blockchain's revolutionary technology advances to the next level—are reminded that they could be subject to securities laws despite their perception to the contrary. Regulators are applying increasing legal scrutiny towards token sales to ensure compliance where appropriate. Some ICOs have cancelled their offerings after discussions with regulators, while others face the risk of prosecution.

Figure 3:
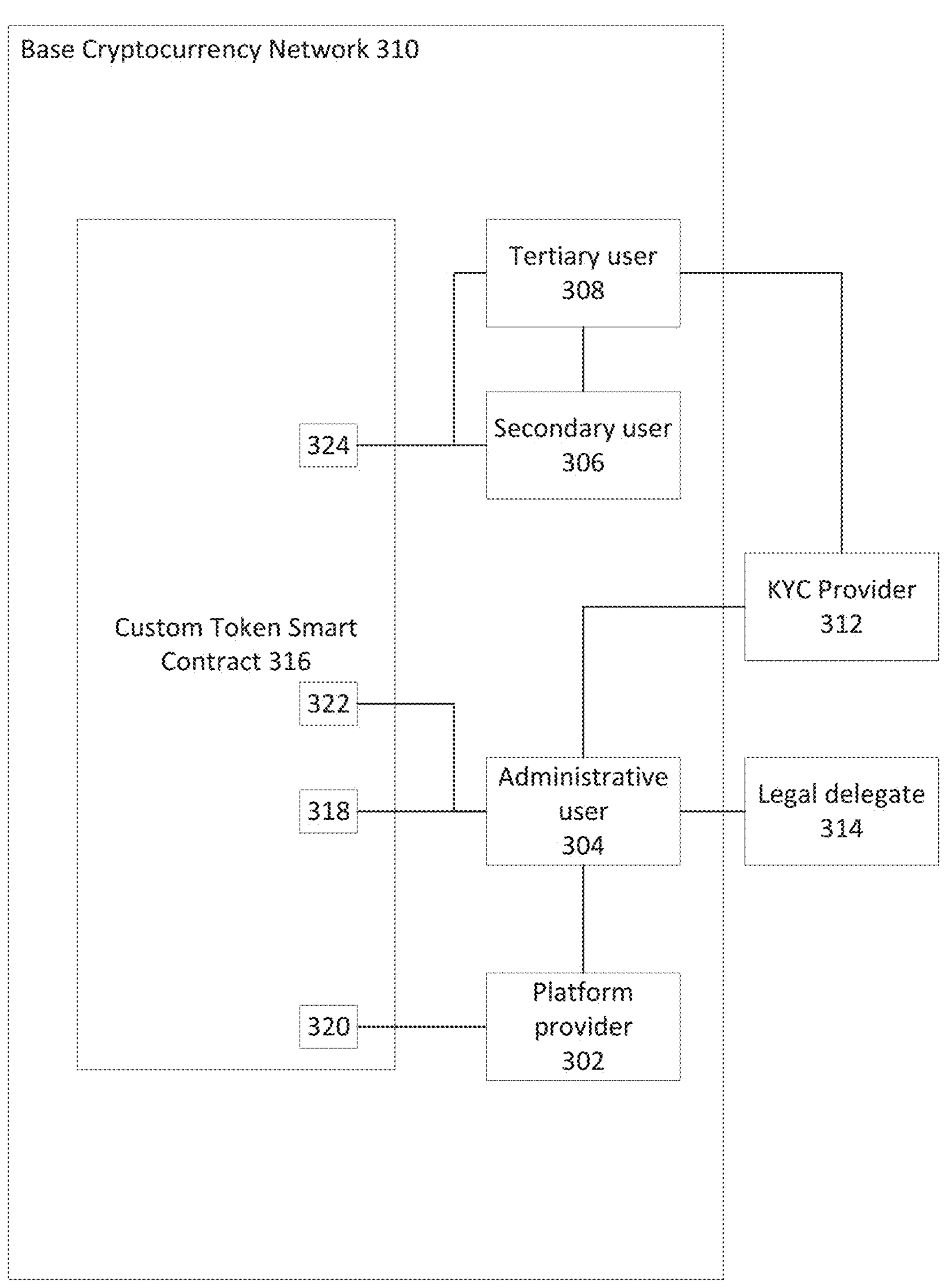
FIG. 3 is a block diagram of various cryptographic addresses and entities included within the data structure of the custom token.

FIG. 3 is a block diagram of various cryptographic addresses and entities included within the data structure of the custom token. A platform provider 302, an administrative user 304, secondary users 306, and tertiary users 308 each have public addresses operating on a base cryptocurrency network 310. A know your customer/accreditation provider (KYC provider) 312 and a legal delegate 314 communicates with the administrative user 304, the secondary users 306, and the tertiary users 308. The platform provider generates a custom token smart contract 316. In some embodiments, each above entity has access to a set of inputs to the smart contract via a graphic user interface. Each set of inputs include cryptographic verification user private cryptographic keys (either single or multi-key depending on the given user).

The platform provider 302 has access to a first set of inputs 318 connected with unlocking included features of the smart contract. The administrative user 304 has access to a second set of inputs 320 connected with updating the smart contract with new software, criterion for interaction, as well as administrative controls over tokens including generation, proliferation, and movement of tokens. In some embodiments, the KYC provider 312 and the legal delegate 314 each have access to a third set of inputs 322 that are connected with verification of public cryptographic addresses and the custom token itself (though what each verifies differ). In some embodiments, the KYC provider 312 and legal delegate 314 each operate “off-chain” and the administrative user includes all controls within the third set of inputs 322.

The secondary 306 and tertiary users 308 both have access to a fourth set of inputs 324 that are connected with transacting in tokens. In some embodiments the fourth set of inputs 324 further include voting controls.

The administrative user 304, via the first set of inputs 318 is able to revoke or reissue tokens that are owned by a given user. Where a user loses their private key and needs a new private key, the administrative user can revert a given transfer and take control of the tokens which may in turn be issued to a new base cryptocurrency address. The administrative user is further able to modify criteria used to regulate secondary transfers of the token. The smart contract sample criteria that may be part of the smart contract include: existence of the a given user's public address on the allowlist, total number investors not exceeded, tokens current available, vesting date reached, given investor does not control greater than a specified amount of total tokens. Via inputs 318 and 322, the administrative user modifies the criteria either adjusting variables or adding/subtracting criteria the smart contract applies.

Figure 4:
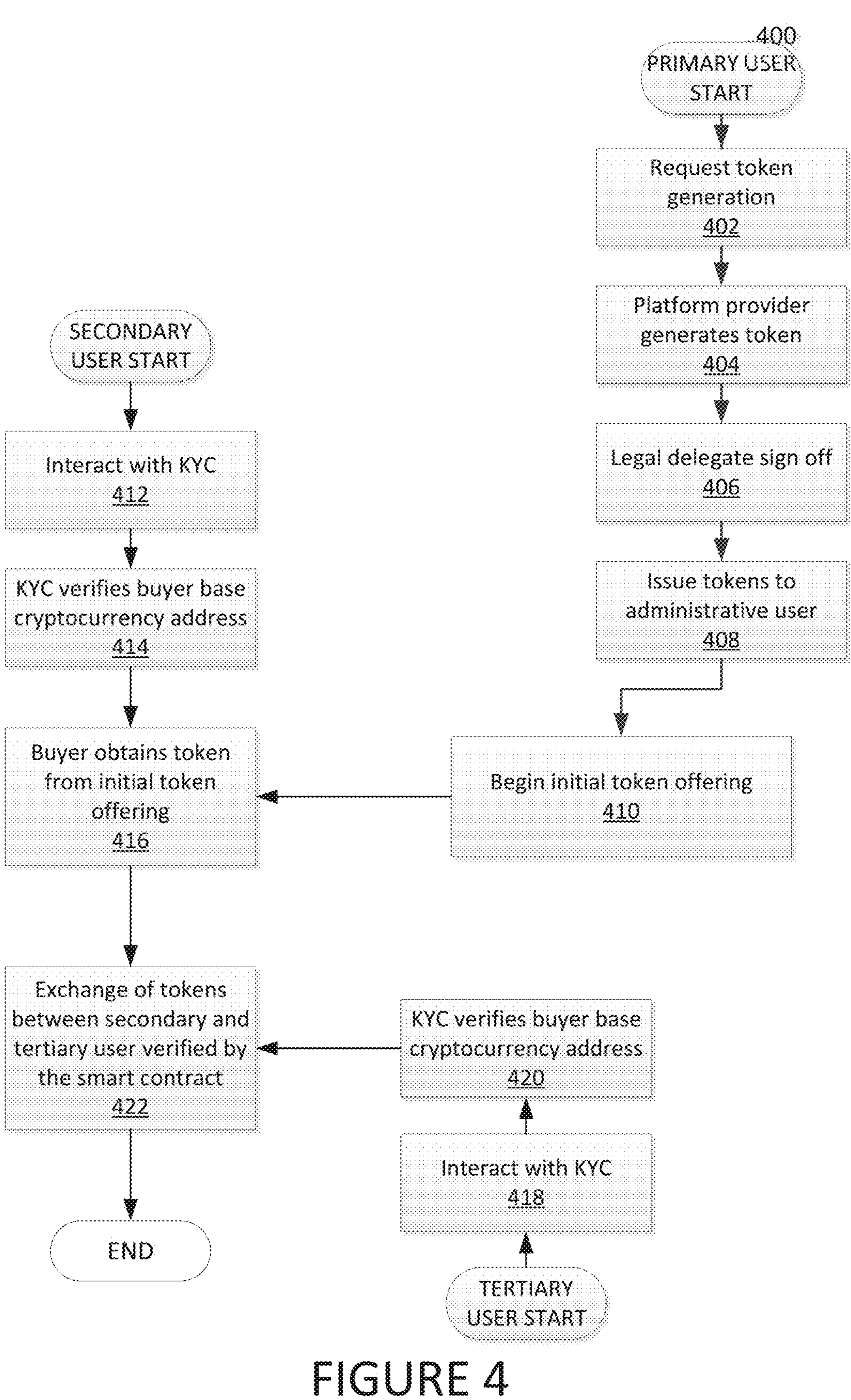
FIG. 4 is a flowchart illustrating platform generation of a custom token followed by the introduction of primary and secondary users to the custom token.

FIG. 4 is a flowchart illustrating platform generation of a custom token followed by the introduction of primary and secondary users to the custom token. In step 402, the administrative user (primary) requests the generation of a custom token from the platform provider. In some embodiments, the administrative user exchanges a utility token (e.g., a ERC-20 coin) to enable features on the custom token. In step 404, the platform provider creates the smart contract including a custom token. In some embodiments, the custom token is non-active and cannot be traded until verified by a legal delegate user. In step 406, a legal delegate user cryptographically signs off on the custom token. When the legal delegate signs off on the custom token, additional trading features are made available to the administrative user. In some embodiments, step 406 is skipped. In step 408, the administrative user issues a plurality of tokens to themselves. In step 410, the administrative user initiates a trading period (initial token offering) where verified users may purchase.

In step 412, a secondary user communicates with the KYC provider. The secondary user validates their credentials with the KYC provider. In this process the KYC provider links a given public address in the base cryptocurrency with an identity of the secondary user. In step 414, after the KYC provider has approved the secondary user, the secondary user appears on an allowlist. In various embodiments, the administrative user adds users to the allowlist, or the KYC user adds users to the allowlist, or a combination of both add users to the allowlist. Users on the white list are able to transact/trade the custom token to other users included on the allowlist.

In step 416, the secondary user obtains an amount of custom tokens from the administrative user via the token offering (step 410). The amount of custom tokens may be fractional. In executing the transfer of custom tokens from the administrative user to the secondary user, the secondary user interacts with the smart contract using their cryptographic key pair associated with the base cryptocurrency. The smart contract first checks that criterion for the transfer are satisfied (e.g., existence of the secondary user's public address on the allowlist, total number inventors not exceeded, tokens current available). Where the criteria are satisfied, the smart contract shifts association of the custom tokens from the administrative user's public address to the secondary user's public address. The shift is prevented where the criteria are not satisfied. The transaction will not resolve.

In step 418, a tertiary user communicates with the KYC provider. The tertiary user validates their credentials with the KYC provider just as the secondary user did (step 412). In this process the KYC provider links a given public address in the base cryptocurrency with an identity of the tertiary user. In step 420, after the KYC provider has approved the tertiary user, the tertiary user appears on an allowlist.

In step 422, the tertiary user obtains an amount of custom tokens from the secondary user via a secondary exchange. In executing the transfer of custom tokens from the secondary user to the tertiary user, both the secondary and tertiary users interact with the smart contract using their respective cryptographic key pairs associated with the base cryptocurrency. The smart contract first checks that criterion for the transfer are satisfied (e.g., existence of the tertiary user's public address on the allowlist, total number investors not exceeded, tokens current available, vesting date reached, given investor does not control greater than a specified amount of total tokens). Where the criterion are satisfied, the smart contract shifts association of the custom tokens from the secondary user's public address to the tertiary user's public address. The secondary exchange does not need to include any involved of the administrative user, though still applies the criterion of the smart contract that are determined based on prior input of the administrative user (and the administrative user's legal delegate).

Secondary User Example

Sophia wishes to invest in a security token using the platform provider. In order to purchase tokens, she needs to have her identity and accreditation status validated by a KYC provider. Sophia uses a web interface to view data, stored in a platform provider smart contract, about KYC providers. Sophia lives in Brazil, so she begins by limiting her search to only those providers who offer KYC services in her country. To review providers, she sorts them by cost and by the number of identities they have successfully validated. Because the smart contract also stores URLs for these providers, Sophia can review their web page and do a web search for the company or contact them directly if she wishes additional assurances. Once Sophia has chosen a KYC provider, she indicates her willingness to work with this provider by sending a transaction with the required amount of ERC-20 utility tokens to the smart contract which manages the KYC marketplace.

These tokens will be held in escrow until the process has been completed. The smart contract records Sophia's Ethereum address and chosen provider, but no personal details. As soon as the KYC process begins, Sophia and the KYC provider can upload and review documents, and work through the KYC provider's checklist. The platform provider provides a library The platform provider.js to power secure, auditable document sharing, but does not have access to view the documents themselves (see Appendix A Encryption). Once the KYC provider has finished validating Sophia's identity, the KYC provider sends a transaction to the platform provider smart contract specifying Sophia's jurisdiction. If Sophia has asked to be accredited, the KYC provider will note this as well.

Along with details relating to Sophia's jurisdiction and accreditation status, the KYC provider can use code provided by the platform provider to produce a final hash to record to blockchain. In this way, the identity validation process can be audited at a later time, so long as the auditor is given access to the documents by Sophia or the KYC provider (see Appendix B Proof of Process). Where required by law, a security broker will be engaged by the investor and will address matters of suitability assessment, the holding of securities, and other customary matters as required in the relevant jurisdiction. Sophia is now able to buy and sell relevant categories of security tokens on the platform. The platform provider's smart contracts enforce any of the limits on her investing. This KYC validation will also be used to validate her identity and eligibility to trade in the secondary market with other investors with validated identities.

Administrative User Example

Acme Corporation wishes to sell security tokens to raise capital for its venture. It begins with an Ethereum transaction to propose a new security token. Acme's name, ticker, and other public information is stored on the chain. Should it choose to do so, Acme can use a multiple signature digital wallet for all of its transactions to make sure that the correct combination of officers are signing. From a technical standpoint, the issuer starts this process by making a call to the createNewSecurityToken function of the platform, specifying the desired security token details (i.e. type of security, rights contained in the security, desired amount to raise, company name, ticker, etc).

Acme's new ST20 standard security token is instantly created—although not yet useful—and stored in a registrar contract on the Ethereum blockchain. The total supply is owned by the issuer and non-transferrable until the legal delegate and issuer confirm that the steps have been completed for the token to be issued. At the point where the token has merely been created, any legal delegates on the platform are notified of this proposed issuance in real time using the event logging functionality built into Ethereum. They are able to propose legal details for the offering (e.g. jurisdictions of investors, type of offering under relevant regulations, hold time before tokens can be resold) as well as the legal delegates' bounty (see Appendix C Successful Issuances).

Acme Corporation reviews these bid details and ensures that enough ERC-20 utility token is sent to the security token contract to cover the costs of the chosen bid. Then Acme and the legal delegate work together through the compliance process. The platform provider provides a web interface for sharing documents in a structured way and generating merkle hash trees from documents. Acme can choose which of these documents they share with the public. This allows the platform provider's system to be used to get longevity of digital documents in a faster, easier, and more secure format than previously possible—i.e., if a security token offering is audited, the issuer can provide documents that are cryptographically signed and timestamped on the blockchain and can explain the process which was taken (see Appendix B Proof of Process). Once all steps of the compliance process have been completed and verified by the issuer and the legal delegate, the delegate will advise the issuer on the investor requirements (jurisdictions and accreditation flags) for this Security Token Offering.

The investor requirements will limit who can hold tokens to residents of certain jurisdictions, set limits on whether non-accredited investors may invest, and place other restrictions as the issuer deems appropriate. At this stage of the issuance process, a bounty is assigned to the legal delegate, but locked until successful issuance or other event of payment occurs pursuant to the smart contract (see Appendix C Successful Issuances). Note that each STO is its own smart contract. This contract ensures that all security tokens related to that contract are traded in accordance with any rules that result from the compliance process, and the smart contract can be updated by the issuer to reflect corporate events and the like. These contracts use the KYC registry contract as an authority on identity/address pairs. This allows investors to participate in multiple offerings without going through the KYC process multiple times, tracks that investor's limitations, and provides for the updating of the KYC process for an investor as the KYC provider deems appropriate.

Token Purchase Example

Sophia is interested in purchasing shares of common stock to be issued by Acme as part of its Security Token Offering. She has already completed the KYC process and reviewed the offering documentation with her financial and tax advisors, but she still needs to check that she is allowed to participate in the offering. Because the issuer hasn't blocked her KYC provider, or residents of Brazil, because Sophia has the correct level of accreditation, and because Sophia's broker enables the transaction, she can purchase tokens. Acme has posted a hash of all necessary documents related to the offering to the blockchain and made the documents available online. All purchase transactions must come in with a hash of the documents. Token exchanges wishing to act as a forum where their customers can invest in the initial offering should ensure that purchasers are advised of the existence of these documents. By including the hash of the documents, investors like Sophie are affirming their understanding of the contents. The platform provider's code includes a tool to validate that the document hasn't been altered (any alteration would change the associated hash).

Security Token Offering Contract Example

In order to allow more fine-grained requirements in a securities offering, legal delegates work with smart contract developers to create new STO contracts. For example, if a security token requires that all investor tokens be locked up for one year after the initial offering, the STO contract is able to enforce this. STO contracts allow the issuer to have control over the offering while reducing time and cost to market by reusing existing contracts that have already undergone security audits and have been used without issue by others. Developers who create STO contracts using the platform provider's tools are incentivized by the ability to earn royalties. Every time a developer's STO contract is used, the developer will receive a payout from the issuers. Additionally, because there is a record on the blockchain of previous STOs the contract has been used for, there is an incentive to build reputation for associated contract developers. The issuer is able to approve the security token for initial offering by calling the setSTO function with a contract address, start time, and end date of the offering. The issuer also has the discretion to execute independent reviews of the STO contract and once satisfied, can transfer the security tokens it owns to the STO contract, making the securities available for sale after the start time.

KYC Provider Example

A KYC provider can join the platform provider's network by calling the newProvider function with its desired fee per verification and a URL that points to a page explaining its services for The platform provider users. KYC providers are notified when an investor requests verification or runs an algorithm to determine jurisdiction and accreditation status and calls the verifyCustomer function to set the investor's verifications. The investor will also include a sufficient fee specified by the KYC provider that is held in escrow until a successful issuance or other event of payment.

Legal Delegate Example

In order to join the platform, a legal delegate sends in a transaction with its base ERC-20 utility token fee and details about the law firm. Among other things, it would include a URL that points to a page on its website with information about its services for issuers on the platform. This web page should also include the Ethereum address of the law firm to prove that the firm has authorized the individual lawyers to act with respect to the platform. Once on the platform, legal delegates can receive notifications when new posts for new issuances arrive and bid on them. In addition to their bids, legal delegates can post a bond in the ERC-20 utility token. This bond indicates to the issuer that the legal delegate is willing to ensure the quality of its work up to some limit. The legal delegate would set an amount of ERC-20 utility token, how long the bond would be in force (from the time the security sales begin), and a "burn" threshold.

Figure 5:
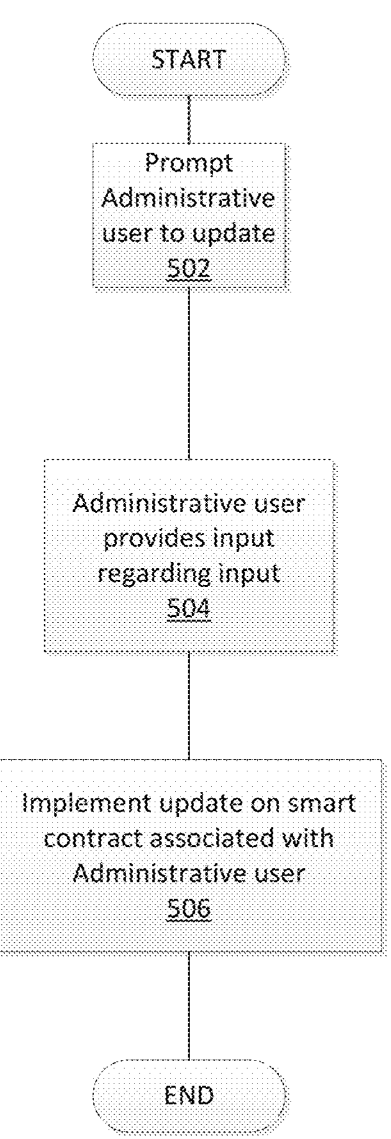
FIG. 5 is a flowchart illustrating smart contract update procedure.

FIG. 5 is a flowchart illustrating smart contract update procedure. In step 502, the administrative user is prompted by the platform provider that new features or regulatory updates are available. With respect to traditional cryptocurrencies the blockchain must either fork (split into two or more separate copies) or entirely adopt new program code. In step 504, the administrative user determines whether to implement the features/updates via a smart contract graphic user interface. In either circumstance, the administrative user applies their private key. In step 506, where the administrative user has selected to move forward with feature implementation, the smart contract adopts the new features/updates. The updates do not require at least 51% of relevant processing, nor control of any particular percentage of the custom tokens. The private key of the administrative user in the base cryptocurrency is sufficient alone to force an update.

Figure 6:
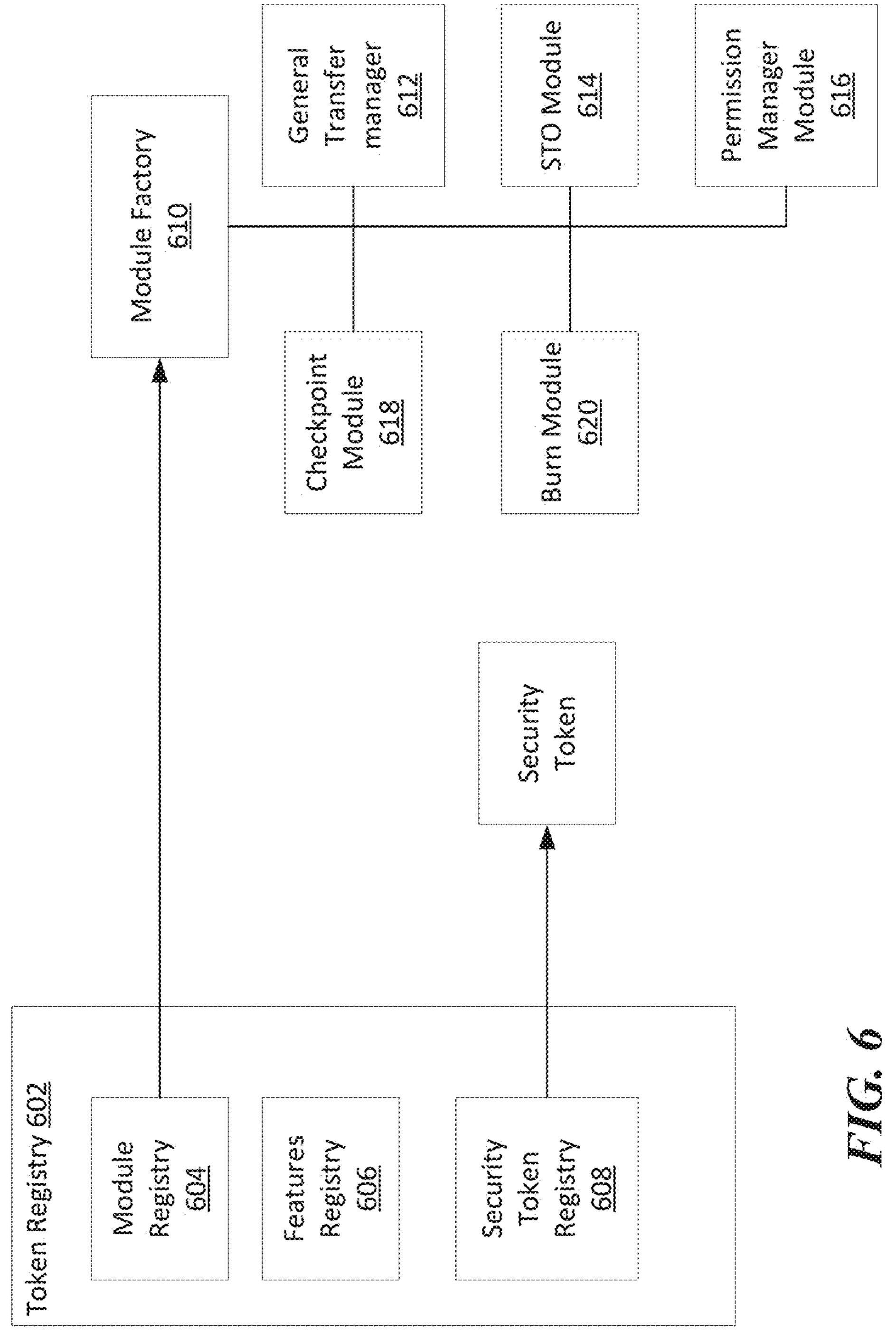
FIG. 6 is a block diagram of the custom token platform.

FIG. 6 is a block diagram of the custom token platform. The platform includes a number of modules that generate smart contracts that execute on the virtual machines of the base cryptocurrency. Modules in this sense are software code that configure processors of computing devices on base network nodes (e.g., miners) to take a set of predetermined action. The modules are stored in memory and/or drove storage.

Users new to the platform are introduced at a token registry interface 602. This registry 602 informs users which tokens and tickers have been registered to the platform. The registry interface 602, allows a platform administrator (distinct from a smart contract administrative user) to prevent users from reserving the same ticker as another issuer (administrative user) as well checking for inputs such as making sure it is a maximum of 10 characters and what the expiry date is on the respective ticker. After it expires someone else can go ahead and reserve it or they you can re-register it. Each module has its own factory which is in charge of deploying an instance of that module for the issuers token.

Specific Components of the Token Registry 602 Include:

- The Module Registry 604—This registry keeps a record of all the different module factories.
- The Features Registry 606—A registry of features that the platform may enable in the future.

There are General factories 610 which each token uses (if wanted). The general factories work by sending the token to the factory where the token asks for an instance of that said module and the token will add an instance of that module to itself. This allows for each token to have unique modules associated with it. All of this is created through the factories and the module registry keeps records of all the different modules factories that are registered.

The platform provider in enabled via platform controls to add or register a module factory to the module registry. The token registry 602 includes 3 main sub-registries: Security Token Registry 608, Features Registry 606, and Module Registry 604. The Security Token (ST-20) is an implementation of the ST-20 protocol that enables the addition of different modules to control token behavior. Different modules can be attached to a SecurityToken.

In some embodiments, the custom token is a ST-20 token which is an Ethereum-based token implemented on top of the ERC-20 protocol that adds the ability for tokens to control transfers based on specific rules. ST-20 tokens rely on Transfer Managers 612 to determine the ruleset the token should apply in order to allow or deny a transfer, be it between the issuer and investors, in a peer to peer exchange, or a transaction with an exchange. To simplify, a base token gives the issuer the ability to add functionality through modules. For example, some modules are enabled to facilitate transfer management. Restrictions include transfers through an allowlist, restricting a transfer between addresses that could make an account go over a specified limit, or restricting based on a limit to the amount of token holders a given Security Token can have.

These modules control the logic behind transfers and how said transfers are allowed or disallowed. By default, the ST (Security Token) gets a GeneralTransferManager 612 module attached in order to determine if transfers are allowed based on an allowlist approach.

The GeneralTransferManager 612 behaves differently depending what type of user is trying to transfer the tokens. a) In an offering setting (investors buying tokens from the issuer) the investor's address should be present on an internal allowlist managed by the issuer within the GeneralTransferManager 612. b) In a peer to peer transfer, restrictions apply based on real-life lockups that are enforced on-chain. For example, if a particular holder has a 1-year sale restriction for the token, the transaction will fail until that year passes.

Another module that is attached to the security token in some embodiments is that security token offering (STO) module 614. The STO module 614 dictates the logic of how initially offered tokens are transferred/distributed. An STO is the equivalent to the Crowdsale contracts often found present in traditional ICOs. A Permission Manager module 616 manages permissions on different aspects of the issuance process. The issuer can use the Permission Manager module 616 to manage permissions and designate administrative users on their token. For example, the issuer might give a KYC provider a set of permissions to add investors to the allowlist. A Checkpoint Module 618 enables the issuer to define checkpoints at which token balances and the total supply of a token are consistently queried. The checkpoint functionality is useful for dividend payment mechanisms and on-chain governance. Dividend payments and on-chain governance each make use of accurate token balances consistently as of a specified point in time. Burn Modules 620 enable issuers or investors to burn or redeem their tokens in exchange of another token that can be on-chain or off-chain.

Security tokens are different from the current blockchain model, where tokens are freely tradable after the primary issuance. Bearer securities, meaning securities that are deemed owned by whoever holds them, are illegal in most jurisdictions. Various numerical and other thresholds can, if exceeded, result in significant regulatory obligations for an issuer. Issuers and financial intermediaries owe duties with respect to tax reporting. Regulations provide protections in some cases from hostile takeovers and other actions by shareholders who may seek to acquire, control or influence a company. Corporate documents or securities terms provide for various rights as to voting, tender offers, dividends, income and other rights that must reach the relevant security holder. The provision of ongoing information to the public or the security holder tends to be required.

The Uniform Commercial Code and variants in many jurisdictions have developed to provide a process by which the successful transfer of a security from one person to another has been formalized and made predictable. For these and a variety of other reasons, security tokens must trade differently from other ERC-20 tokens, bitcoin, virtual currencies, and other digital assets. In addition, token exchanges generally do not list security tokens in order to avoid regulatory enforcement for dealing securities. With the advent of decentralized and even anonymous exchanges, this form of regulation becomes difficult and has caused some governments to ban token sales entirely. With freely open secondary trading, issuers would be unable to determine the identity, jurisdiction and accreditation status of its securities holders, and would be unable to comply with applicable law, with potentially major consequences for the company, its management, its security holders, and the customer base for the company's products.

The platform provider seeks to solve this problem by addressing secondary markets at the protocol level within the existing regulatory and commercial frameworks. When a security token is created and issued through the platform, the token is programmed to verify who can buy and sell the token. Further, whom can buy and sell the token may be changed by an administrator or other entity with administrative privileges even after the token has moved to another's cryptographic wallet. The security token restricts token holders from trading to any address that has not passed the required verifications. With the inherent limitations restrictions, even decentralized and anonymously run exchanges, such as exchanges in jurisdictions that do not impose substantive regulations, will only be able to conduct trades to authorized participants consistent with the issuer's requirements. The restrictions provide issuers assurance that their tokens will only be held by authorized investors and will be subject to those other restrictions that the issuer wishes to place on the securities.

This fundamentally changes the securities market. The need for operating and maintaining a centralized exchange disappears almost entirely because the security token is self-regulating. Additionally, it ushers securities onto a new decentralized secondary market with different fee structure, instant settlement times, and around the clock trading.

The document audit trail and data from the security token creation and compliance processes are uploaded to the transparent and fully auditable Ethereum blockchain. Compared with current centralized and vulnerable storage systems for securities offerings such as the SEC's EDGAR database in the United States, the platform provider seeks to prevent high-profile hacks from occurring by isolating the storage of each security offering. This all-digital approach allows for a much more efficient and scalable system, which is important given that the EDGAR system is currently processing 50 million document requests and over 1.7 million electronic filings per year. Many non-U.S. jurisdictions have no similar online system with such easy access. The platform provider allows for records related to the security in questions to be validated, without having to validate all other blockchain data that is unrelated, thus reducing the validation from hundreds of gigabytes of data to a fraction of that amount. For documentation that will have to be uploaded to EDGAR, the hope is that an issuer's documentation will be easier to compile for filing purposes once the platform provider's tools are utilized.

In order to disincentivize fraudulent activity from legal delegates and STO developers, bounty payments in ERC-20 tokens may be held until a successful issuance takes place or other event of payment occurs under the terms of the smart contract. In a situation where the quality of these service provider's work is in doubt, if the bounty payments are still vesting, original token holders can vote to freeze legal delegate and STO developer funds, if the issuer's token have been set up to allow for that. This vote is calculated when an STO has ended: A snapshot of each security token holder's balances is taken, and votes are weighted based on those balances. The threshold required to freeze funds would have to be specified in advance in the legal delegate and developer bids. This reduces economic incentive to attempt fraud on the network.

Figure 7:
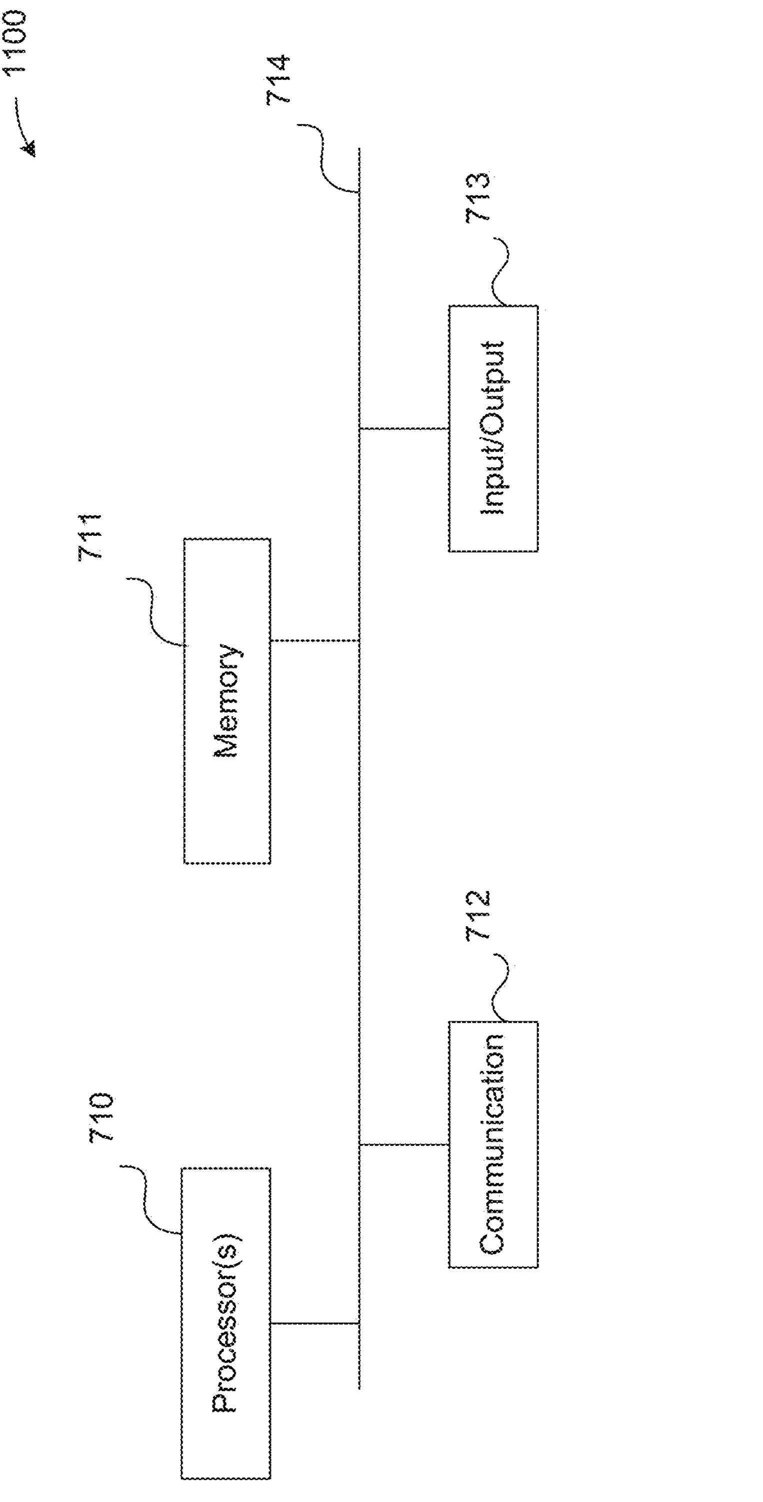
FIG. 7 is a high-level block diagram showing an example of a processing device that can represent a system to run any of the methods/algorithms described above.

FIG. 7 is a high-level block diagram showing an example of a processing device 700 that can represent a system to run any of the methods/algorithms described above. A system may include two or more processing devices such as represented in FIG. 7, which may be coupled to each other via a network or multiple networks. A network can be referred to as a communication network.

In the illustrated embodiment, the processing device 700 includes one or more processors 710, memory 711, a communication device 712, and one or more input/output (I/O) devices 713, all coupled to each other through an interconnect 714. The interconnect 714 may be or include one or more conductive traces, buses, point-to-point connections, controllers, scanners, adapters and/or other conventional connection devices. Each processor 710 may be or include, for example, one or more general-purpose programmable microprocessors or microprocessor cores, microcontrollers, application specific integrated circuits (ASICs), programmable gate arrays, or the like, or a combination of such devices. The processor(s) 710 control the overall operation of the processing device 700. Memory 711 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 711 may store data and instructions that configure the processor(s) 710 to execute operations in accordance with the techniques described above. The communication device 712 may be or include, for example, an Ethernet adapter, cable modem, Wi-Fi adapter, cellular transceiver, Bluetooth transceiver, or the like, or a combination thereof. Depending on the specific nature and purpose of the processing device 700, the I/O devices 713 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 700 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of operating a cryptographic token comprising:

in response to input by a first user, generating a number of cryptographic tokens that correspond to a smart contract recorded on a cryptographic ledger and associated with a first cryptographic address;

directing a first transfer, via a distributed consensus network, of a first cryptographic token and a second cryptographic token of the number of cryptographic tokens from the first cryptographic address associated with the first user to a second cryptographic address associated with a second user, wherein the second user belongs to a first class of users; and restricting post-issuance transfers of the second cryptographic token from the second cryptographic address to a third cryptographic address associated with a third user based on a specified criterion of the smart contract wherein transfers are cryptographically prevented from executing while the specified criterion is unsatisfied, wherein the specified criterion is a maximum number of cryptographic addresses that can store the number of cryptographic tokens, wherein the maximum number of cryptographic addresses corresponds to a maximum number of users that belong to the first class of users, and wherein transferring the second cryptographic token to the third user would exceed the maximum number of cryptographic addresses.

2. The method of claim 1, further comprising:

directing a second transfer, via the distributed consensus network, of the first cryptographic token of the number of cryptographic tokens from the second cryptographic address associated with the second user to a fourth cryptographic address associated with a fourth user;

verifying, according to the specified criterion, that the fourth user associated with the fourth cryptographic address is included on an allowlist associated with the smart contract.

3. The method of claim 1, wherein the input is first input, the method further comprising:

in response to a second input by the first user, directing a reversal of the first transfer.

4. The method of claim 1, further comprising:

verifying, in accordance with the specified criterion, that a vesting date associated with the smart contract has occurred; and in response to said verifying, directing a second transfer, via a distributed consensus network, of the first cryptographic token of the number of cryptographic tokens from the second cryptographic address associated with the second user to a fourth cryptographic address associated with a fourth user.

5. The method of claim 1, further comprising:

receiving, from an authorized user, cryptographically signed instructions to modify the specified criterion; and in response to receiving a cryptographically signed authorization by the authorized user, implementing the cryptographically signed instructions to modify the specified criterion of the smart contract that impose new conditions on transfers of cryptographic tokens that are not in possession of the first user, the new conditions associated with the receiving user of the cryptographic token, wherein authorization from any other user is not required to implement the cryptographically signed instructions.

6. The method of claim 5, wherein the authorized user is any of:

the first user; or an administrative user that does not own any of the number of cryptographic tokens.

7. The method of claim 1, wherein the input is first input, the method further comprising:

in response to second input by the first user, prompting owners of cryptographic tokens to make a choice on a voting platform.

8. The method of claim 1, wherein the first cryptographic address is a multi-signature address, and wherein the first user comprises a set of users that each have a different corresponding private cryptographic key that is used to control the multi-signature address.

9. A system comprising:

a network interface configured to:

communicate with a distributed network including an immutable public ledger of cryptographic assets, and transmit input by a first user to the distributed network, the distributed network being configured to generate a number of cryptographic tokens that correspond to a smart contract recorded on public ledger, wherein further input by the first user to the distributed network causes a first cryptographic token and a second cryptographic token of the number of cryptographic tokens to transfer from a first cryptographic address associated with the first user to a second cryptographic address associated with a second user; and a memory configured to store a current version of the public ledger and executable code associated with the smart contract, wherein the smart contract restricts further post-issuance transfers of the first cryptographic token from the second cryptographic address to a third cryptographic address associated with a third user based on a specified criterion of the smart contract wherein transfers are cryptographically prevented from executing while the specified criterion is unsatisfied, wherein the specified criterion is a maximum number of cryptographic addresses that can store the number of cryptographic tokens, wherein the maximum number of cryptographic addresses corresponds to a maximum number of users, and wherein transferring the second cryptographic token to the third user would exceed the maximum number of cryptographic addresses.

10. The system of claim 9, wherein the network interface is further configured to direct a reversal of the first transfer in response to input by the first user.

11. The system of claim 9, wherein the network interface is further configured to transmit cryptographically signed instructions causing a modification of the specified criterion.

12. The system of claim 9, wherein the smart contract is configured to prompt owners of cryptographic tokens to make a choice on a voting platform in response to input by the first user transmitted by the network interface.

13. The system of claim 9, wherein the first user comprises a set of users each having a different corresponding private cryptographic key that is used to control a multi-signature address.

14. The system of claim 9, wherein the network interface is further configured to:

receive, from an authorized user, cryptographically signed instructions to modify the specified criterion; and in response to receiving a cryptographically signed authorization by the authorized user, implement the cryptographically signed instructions to modify the specified criterion that impose new conditions on transfers of cryptographic tokens that are not in possession of the first user, the new conditions associated with the receiving user of the cryptographic token, wherein authorization from any other user is not required to implement the cryptographically signed instructions.

15. A non-transitory computer-readable storage medium comprising computer instructions that when executed by a processor, cause a computer system to perform those steps of:

in response to input by a first user, generating a number of cryptographic tokens that correspond to a smart contract recorded on a cryptographic ledger and associated with a first cryptographic address;

directing a first transfer, via a distributed consensus network, of a first cryptographic token and a second cryptographic token of the number of cryptographic tokens from the first cryptographic address associated with the first user to a second cryptographic address associated with a second user, wherein the second user belongs to a first class of users; and restricting post-issuance transfers of the second cryptographic token from the second cryptographic address to a third cryptographic address associated with a third user based on a specified criterion of the smart contract wherein transfers are cryptographically prevented from executing while the specified criterion is unsatisfied, wherein the specified criterion is a maximum number of cryptographic addresses that can store the number of cryptographic tokens, wherein the maximum number of cryptographic addresses corresponds to a maximum number of users, and wherein transferring the second cryptographic token to the third user would exceed the maximum number of cryptographic addresses.

16. The non-transitory computer-readable storage medium of claim 15, the computer instructions causing the computer system to perform steps further comprising:

directing a second transfer, via a distributed consensus network, of the first cryptographic token of the number of cryptographic tokens from the second cryptographic address associated with the second user to a fourth cryptographic address associated with a fourth user;

verifying, according to the specified criterion, that the fourth user associated with the fourth cryptographic address is included on an allowlist associated with the smart contract.

17. The non-transitory computer-readable storage medium of claim 15, the computer instructions causing the computer system to perform steps further comprising:

verifying, in accordance with the specified criterion, that a vesting date associated with the smart contract has occurred; and in response to said verifying, directing a second transfer, via a distributed consensus network, of the first cryptographic token of the number of cryptographic tokens from the second cryptographic address associated with the second user to a fourth cryptographic address associated with a fourth user.

18. The non-transitory computer-readable storage medium of claim 15, wherein the computer instructions further comprise:

receive, from an authorized user, cryptographically signed instructions to modify the specified criterion; and in response to receiving a cryptographically signed authorization by the authorized user, implement the cryptographically signed instructions to modify the specified criterion that impose new conditions on transfers of cryptographic tokens that are not in possession of the first user, the new conditions associated with the receiving user of the cryptographic token, wherein authorization from any other user is not required to implement the cryptographically signed instructions.

19. The non-transitory computer-readable storage medium of claim 18, wherein the authorized user is any of:

the first user; or an administrative user that does not own any of the number of cryptographic tokens.

* * * * *